United States Patent
Brown et al.

(10) Patent No.: US 10,554,248 B1
(45) Date of Patent: Feb. 4, 2020

(54) SYSTEM AND METHOD FOR DEMODULATING CODE SHIFT KEYING DATA UTILIZING CORRELATIONS WITH COMBINATIONAL PRN CODES GENERATED FOR DIFFERENT BIT POSITIONS

(71) Applicant: NovAtel Inc., Calgary (CA)

(72) Inventors: David Brown, Calgary (CA); Patrick C. Fenton, Calgary (CA)

(73) Assignee: NovAtel Inc., Calgary, AB (CA)

( * ) Notice: Subject to any disclaimer, the term of this patent is extended or adjusted under 35 U.S.C. 154(b) by 0 days.

(21) Appl. No.: 16/142,799

(22) Filed: Sep. 26, 2018

(51) Int. Cl.
*H04B 1/709* (2011.01)

(52) U.S. Cl.
CPC ................... *H04B 1/709* (2013.01)

(58) Field of Classification Search
CPC ......... H04B 1/707–70758; H04B 1/709–7095; H04L 7/04–043; H04L 9/06–0668
See application file for complete search history.

(56) References Cited

U.S. PATENT DOCUMENTS

| | | | | |
|---|---|---|---|---|
| 5,982,807 A * | 11/1999 | Snell | ............. | H04B 1/707 370/342 |
| 6,313,789 B1 * | 11/2001 | Zhodzishsky | ............. | G01S 19/29 342/357.68 |
| 6,424,641 B1 * | 7/2002 | Kotov | ............. | H04B 1/70757 370/342 |
| 6,580,750 B2 * | 6/2003 | Aue | ............. | H04B 1/7073 375/150 |
| 6,687,316 B1 * | 2/2004 | McGraw | ............. | H04B 1/7085 375/149 |
| 6,728,637 B2 * | 4/2004 | Ford | ............. | G01C 21/28 342/357.32 |
| 6,888,497 B2 * | 5/2005 | King | ............. | G01S 5/0221 342/357.69 |
| 7,082,286 B2 * | 7/2006 | Kaewell, Jr. | ............. | H04B 1/7075 455/65 |
| 7,190,711 B2 * | 3/2007 | Keller | ............. | H04B 1/70752 375/150 |
| 7,295,635 B2 * | 11/2007 | Coatantiec | ............. | H04B 1/7085 375/144 |

(Continued)

OTHER PUBLICATIONS

Hein, Gunter W. "Code Shift Keying" Inside GNSS, Nov. 19, 2015, 11 pages.

(Continued)

*Primary Examiner* — James M Perez
(74) *Attorney, Agent, or Firm* — Cesari and McKenna, LLP

(57) ABSTRACT

A Global Navigation Satellite System (GNSS) receiver demodulates code shift keying (CSK) data utilizing correlations with combinational pseudo-random noise (PRN) codes generated for different bit positions. The GNSS receiver receives a signal including a PRN code modulated by CSK to represent a symbol (i.e., CSK modulated symbol). The GNSS receiver maintains a plurality of receiver codes, each representing a different shift in chips to the PRN code. The GNSS receiver performs a chip-by-chip linear combination of a group of receiver codes for each bit position of the CSK modulated symbol. The GNSS receiver correlates the received signal with each combinational PRN code to produce a binary value that is the CSK modulated symbol.

20 Claims, 9 Drawing Sheets

(56) References Cited

U.S. PATENT DOCUMENTS

| | | | | |
|---|---|---|---|---|
| 7,298,324 B2* | 11/2007 | Manz | | G01S 19/22 342/357.23 |
| 7,298,780 B2* | 11/2007 | Zhengdi | | G01S 19/21 375/150 |
| RE40,231 E * | 4/2008 | Snell | | H04B 1/707 370/342 |
| 7,411,993 B2* | 8/2008 | Sunaga | | H04J 13/10 375/130 |
| 7,738,536 B2* | 6/2010 | Fenton | | G01S 19/21 342/357.61 |
| 7,885,317 B2* | 2/2011 | Fenton | | G01S 19/30 375/147 |
| 7,916,771 B2* | 3/2011 | Julien | | G01S 19/30 375/145 |
| 7,983,323 B2* | 7/2011 | Kent | | H04B 1/7115 375/148 |
| 8,023,554 B2* | 9/2011 | Kent | | H04B 1/7115 375/144 |
| 8,189,646 B2* | 5/2012 | Ries | | G01S 19/02 375/140 |
| 8,265,126 B2* | 9/2012 | Sanji | | H04B 1/7075 375/130 |
| 8,279,911 B2* | 10/2012 | Farmer | | G01S 19/22 375/150 |
| 8,442,097 B2* | 5/2013 | Fenton | | G01S 19/21 375/150 |
| 8,649,415 B2* | 2/2014 | Pratt | | H04J 13/0022 375/146 |
| 8,675,751 B2* | 3/2014 | Cannon | | H04L 27/183 375/144 |
| 8,774,315 B2* | 7/2014 | Cahn | | H04B 1/707 375/274 |
| 9,071,342 B1* | 6/2015 | Jin | | G01S 19/30 |
| 9,172,524 B2* | 10/2015 | Yoon | | G01S 19/30 |
| 9,306,789 B2* | 4/2016 | Dhayni | | H04L 27/2657 |
| 9,331,755 B2* | 5/2016 | Castelain | | H04B 7/0421 |
| 9,515,697 B2* | 12/2016 | Raasakka | | G01S 19/26 |
| 10,056,937 B1* | 8/2018 | Neff | | H04B 1/70735 |
| 10,088,573 B2* | 10/2018 | Wallner | | G01S 19/01 |
| 10,177,950 B2* | 1/2019 | Floch | | H04L 27/2278 |
| 2002/0107636 A1* | 8/2002 | Ford | | G01C 21/28 701/469 |
| 2003/0036849 A1* | 2/2003 | Ford | | G01C 21/28 701/469 |
| 2003/0231580 A1* | 12/2003 | Martin | | G01S 19/02 370/203 |
| 2004/0071200 A1* | 4/2004 | Betz | | H04B 1/70752 375/152 |
| 2004/0196923 A1* | 10/2004 | Feher | | H04B 1/69 375/299 |
| 2005/0012664 A1* | 1/2005 | Gerein | | G01S 19/29 342/357.74 |
| 2005/0281318 A1* | 12/2005 | Neugebauer | | H04B 1/707 375/134 |
| 2007/0058700 A1* | 3/2007 | Fenton | | G01S 19/30 375/150 |
| 2007/0064776 A1* | 3/2007 | Feller | | G01S 19/22 375/149 |
| 2008/0212656 A1* | 9/2008 | Feher | | H04L 27/34 375/150 |
| 2012/0236905 A1* | 9/2012 | Judd | | G01S 13/18 375/130 |
| 2012/0321007 A1* | 12/2012 | Feher | | H04W 64/00 375/261 |
| 2013/0021934 A1* | 1/2013 | Rugamer | | G01S 19/13 370/252 |
| 2014/0056333 A1* | 2/2014 | Neff | | H04B 1/7073 375/149 |
| 2014/0191903 A1* | 7/2014 | Vigneau | | G01S 19/44 342/357.68 |
| 2014/0219393 A1* | 8/2014 | Tang | | G01S 19/02 375/303 |
| 2015/0338520 A1* | 11/2015 | Boriskin | | G01S 19/13 342/357.51 |
| 2017/0108588 A1* | 4/2017 | Wei | | G01S 19/30 |
| 2017/0285174 A1* | 10/2017 | Zhu | | G01S 19/29 |
| 2017/0366219 A1* | 12/2017 | Kalkunte | | H04B 1/70752 |
| 2018/0143328 A1* | 5/2018 | Ries | | G01S 19/51 |
| 2018/0239026 A1* | 8/2018 | Veitsel | | G01S 19/243 |
| 2019/0253301 A1* | 8/2019 | Hadaschik | | G01S 5/14 |

OTHER PUBLICATIONS

Suzuki, T., Kubo, N., Takasu, T., "Evaluation of Precise Point Positioning Using MADOCA-LEX via Quasi-Zenith Satellite System," *Proceedings of the 2014 International Technical Meeting of The Institute of Navigation*, San Diego, California, Jan. 2014, pp. 460-470.

Axel Javier Garcia Peña, Daniel Salós, Olivier Julien, Lionel Ries, Thomas Grelier. Analysis of the use of CSK for Future GNSS Signals. ION GNSS 2013, 26th International Technical Meeting of The Satellite Division of the Institute of Navigation, Sep. 2013, Nashville, United States. ION, pp. 1461-1479, 2013.

Axel Javier Garcia Peña, Marie-Laure Boucheret, Christophe Macabiau, Jean-Louis Damidaux, Lionel Ries, et al.. Implementation of Code Shift Keying signaling technique in GALILEO E1 signal. NAVITEC 2010, 5th ESA Workshop on Satellite Navigation Technologies and European Workshop on GNSS Signals, Dec. 2010, Noordwijk, Netherlands. pp. 1-8, 2010.

* cited by examiner

FIG. 3A

| | | | | | | | | | |
|---|---|---|---|---|---|---|---|---|---|
| Sum(1A)= | 0 | -2 | 0 | 0 | 0 | 0 | -2 | 0 | 0 |
| Sum(1B)= | 0 | 0 | -2 | 0 | 0 | 0 | 0 | -2 | 0 |
| Sum(1C)= | 0 | -2 | 2 | 0 | 0 | 0 | -2 | 2 | 0 |

FIG. 6

SYSTEM AND METHOD FOR DEMODULATING CODE SHIFT KEYING DATA UTILIZING CORRELATIONS WITH COMBINATIONAL PRN CODES GENERATED FOR DIFFERENT BIT POSITIONS

CROSS-REFERENCE TO RELATED APPLICATIONS

The present application is related to U.S. Patent Application Ser. No. 16/142,747, which was filed on Sep. 26, 2018 by Patrick C. Fenton and David Brown for "SYSTEM AND METHOD FOR DEMODULATING CODE SHIFT KEYING DATA FROM A SATELLITE SIGNAL UTILIZING A BINARY SEARCH", which is hereby incorporated by reference.

BACKGROUND

Technical Field

The invention relates generally to a Global Navigation Satellite System (GNSS), and more particularly, to a GNSS receiver for demodulating code shift keying (CSK) data utilizing correlations with combinational pseudo-random noise (PRN) codes generated for different bit positions.

Background Information

The Quasi-Zenith Satellite System (QZSS) is a Japan-based performance enhancement system for Global Positioning System (GPS) in the Asia-Pacific area. Its L6 signal, e.g., L61 or L62, carries precise GPS/QZSS positioning correction data that, for example, supports Precise Point Positioning (PPP).

The L6 signal is Binary Phase Shift Keying (BPSK) modulated by a pseudo-random noise (PRN) code of length 10230 chips with a rate of 2.5575 Mcps (Million Chips Per Second) repeating every 4 ms. The L6 signal is further modulated by code shift keying (CSK) to represent an 8-bit symbol of an L6 navigation message that is 2000 bits. As such, CSK modulation allows for the transmission of 8-bits during one code period (e.g., 4 ms), and thus allows the L6 navigation message of 2000 bits to be transmitted in 1 second.

Although utilization of CSK modulation is favorable in terms of data transmission rate (e.g., 2 kbps), it puts a computation burden on Global Navigation Satellite System (GNSS) receivers that need to demodulate CSK data (e.g., the 8-bit symbol) from the L6 signal. For example, prior art techniques may perform a brute force implementation that utilizes 256 different correlators, where each correlator is associated with a different PRN shift from 0-255. On each accumulation period of 4 ms, a single correlator corresponding to the L6 signal will have power, and the GNSS receiver determines the CSK data is the PRN shift associated with the correlator that has power.

An alternative prior art technique for demodulating the CSK data is achieved through implementation of Fourier Transforms and Inverse Fourier Transforms. However, these implementations require great hardware, software, and/or computational resources. What is needed is a simpler and more efficient system for demodulating CSK data.

SUMMARY

The inventive system and method demodulates code shift keying (CSK) data utilizing correlations with combinational pseudo-random noise (PRN) codes generated for different bit positions. A Global Navigation Satellite System (GNSS) receiver receives one or more satellite signals from one or more GNSS satellites. The satellite signal may be an L6 signal, e.g., L61 or L62, from the Quasi-Zenith Satellite System (QZSS) that includes a 4 ms PRN code (hereinafter "Code 1") of 10230 chips that is modulated by CSK to represent an 8-bit symbol of an L6 navigation message that is 2000 bits. As used herein, "CSK modulated symbol" refers to the 8-bit symbol represented by the PRN code modulated by CSK. The L61 signal may include a 410 ms PRN code (hereinafter "Code 2") of 1048575 chips (i.e., pilot channel) that is modulated by a square wave with a period of 820 ms that is utilized for synchronization purposes, while the L62 signal may include a second data channel.

The GNSS receiver maintains the fundamental PRN code (i.e., the un-shifted PRN code) and a plurality of receiver codes, where each receiver code is the fundamental PRN code shifted a selected number of chips. The total number of receiver codes may be based on the total number of bits (N) of the CSK modulated symbol. Specifically, and because the CSK modulated symbol is a binary representation, the CSK modulated symbol may be any of $2^N$ permutations. For example, and for an 8-bit symbol, the CSK modulated symbol may be any of 256 different permutations ($2^8=256$). Thus, each of the plurality of receiver codes is the fundamental PRN code shifted a different number of chips from 1 to 255 to represent different possible CSK modulated symbols.

In an embodiment, the GNSS receiver generates N combinational PRN codes, where each combinational PRN code is generated for a different bit position of the CSK modulated symbol by performing a chip-by-chip summation (i.e., linear combination) of a group of receiver codes. The receiver codes of the group, utilized in the chip-by-chip summation for a particular bit position, correspond to particular CSK modulated symbols that are set to particular values at the particular bit position (e.g., HIGH and/or LOW).

For example, a first set of N combinational PRN codes may be generated based on particular bit positions of particular CSK modulated symbols being set HIGH (e.g., 1). Specifically, each receiver code utilized in the chip-by-chip summation for a particular bit position corresponds to a particular CSK modulated symbol that is set HIGH at the particular bit position.

In addition or alternatively, a second set of N combinational PRN codes may be generated based on particular bit positions of particular CSK modulated symbols being set LOW (e.g., 0). Specifically, each receiver code utilized in the chip-by-chip summation for a particular bit position may correspond to a particular CSK modulated symbol that is set LOW at the particular bit position.

In addition or alternatively, a third set of N combinational PRN codes may be generated based on chip-by-chip differences (i.e., linear combination) of the first set of combinational PRN codes and the second set of combinational PRN codes. For example, the combinational PRN code from the second set and for a particular bit position may be subtracted from the combinational PRN code from the first set and for the particular bit position to generate the combinational PRN code for the third set and for the particular bit position. Alternatively, each combinational PRN code for a particular bit position and for the third set may be generated by performing a chip-by-chip addition (i.e., linear combination) of the receiver codes where the particular bit position is set HIGH while performing a chip-by-chip subtraction (i.e., linear combination) of the receiver codes where the particular bit position is set LOW.

In an embodiment, the GNSS receiver utilizes N correlators to correlate the L6 signal with each combinational PRN code of the first set of combinational PRN codes or the second set of combinational PRN codes. Alternatively, a single multiplexed correlator may be utilized to correlate the received signal with each combinational PRN code of the first set of combinational PRN codes or the second set of combinational PRN codes. The correlations produce respective power level values for each bit position that are compared to power threshold values. The comparisons produce a binary value that represents the CSK modulated symbol, i.e., the 8-bit symbol represented in the received L6 signal. The determined 8-bit symbol is the demodulated CSK data.

In a further embodiment, and when utilizing the first set of combinational PRN codes, an additional dedicated correlator may be utilized for the fundamental PRN code to distinguish between a produced binary value of 00000000 (e.g., binary representation of zero) based on the correlations and a lack of an input signal. The received signal may then be correlated with the fundamental PRN code utilizing the additional dedicated correlator. If the additional dedicated correlator has a power level value that is greater than the power threshold value, it is determined that the CSK modulated symbol in the L6 signal is zero (e.g., 00000000) and not a lack of an input signal. Thus, a total number of correlators required, when utilizing the first set of combinational PRN codes to demodulate the CSK data is N plus one.

In a further embodiment, and when utilizing the second set of combinational PRN codes, the additional dedicated correlator may be utilized for the fundamental PRN code shifted 255 chips to the left to distinguish between a produced binary value of 11111111 (e.g., binary representation of 255) based on the correlations and a lack of an input signal. The received signal may then be correlated with the fundamental PRN code shifted 255 chips to the left utilizing the additional dedicated correlator. If the additional dedicated correlator has a power level value that is greater than the power threshold value, it is determined that the CSK modulated symbol in the L6 signal is 255 (e.g., 11111111) and not a lack of an input signal. Thus, a total number of correlators required, when utilizing the second set of combinational PRN codes to demodulate the CSK data is N plus one.

In a further embodiment, the GNSS receiver utilizes a total number of correlators equal to N to demodulate the CSK data from the L6 signal. For example, the GNSS receiver utilizes eight correlators to correlate the L6 signal with each combinational PRN code of the third set of combinational PRN codes. The magnitudes of the correlation power level values are compared with a threshold value to determine the presence of a signal. If a signal is determined to be present, the sign of each correlation power level value is used to determine the value at each bit position. If the value of a power correlation level value is positive, the value of the bit position is set HIGH (e.g., 1). If the value of a power correlation level value is negative, the value of the bit position is set LOW (e.g., 0). The bit value determinations produce a binary value that represents the CSK modulated symbol, i.e., the 8-bit symbol represented in the received L6 signal. The determined 8-bit symbol is the demodulated CSK data.

In an even further embodiment, the GNSS receiver utilizes a total number of correlators equal to N times two to demodulate the CSK data from the L6 signal. For example, the GNSS receiver utilizes sixteen correlators to correlate the L6 signal with each combinational PRN code of the first set of combinational PRN codes to produce first correlation power level values and the second set of combinational PRN codes to produce second correlation power level values. The GNSS receiver then subtracts a second correlation power level value from a first correlation power level value for each bit position to produce respective differenced power level values for each bit position. The magnitudes of the differenced correlation power level values are compared with a threshold value to determine the presence of a signal. If a signal is determined to be present, the sign of each differenced correlation power level value is used to determine the value at each bit position. If the value of a differenced power correlation level value is positive, the value of the bit position is set HIGH (e.g., 1). If the value of a differenced power correlation level value is negative, the value of the bit position is set LOW (e.g., 0). The bit value determinations produce a binary value that represents the CSK modulated symbol, i.e., the 8-bit symbol represented in the received L6 signal. The determined 8-bit symbol is the demodulated CSK data.

The GNSS receiver may demodulate the CSK data from 250 consecutive L6 4 ms signal sample sets to determine the binary value of the entire L6 message that is 2000 bits. The demodulated L6 message may then be utilized by the GNSS receiver for Precise Point Position (PPP) or for any of a variety of different accurate positioning techniques, as known by those skilled in the art.

Advantageously, the inventive system and method leverages the low cross correlation accumulations of PRN codes. As known by those skilled in the art, cross correlations are produced when a PRN code is correlated with a shifted version of itself. The expected value of a cross correlation of a 10230 chip PRN code is zero with a standard deviation related to the number of chips in the PRN code. By definition, the value of each chip (e.g., +1 or −1) of a PRN code is random with respect to all of its neighbors. Therefore, the PRN code's correlation noise behavior can be estimated by the Central Limits Theorem. According to the Central Limits Theorem, the variance of an accumulation can be estimated by the sum of the individual sample variances. The variance of each PRN chip by definition is 1, thus the variance of a cross correlation sum of 10230 chips is 10230. Therefore, the standard deviation of the correlation is approximately 101 (e.g., sqrt(10230)), whereas the expected value of an in-phase correlation of the PRN code is 10230.

A correlation accumulation of a modulated signal with a locally generated PRN code that is perfectly aligned or in-phase with the modulated signal will produce a value that is approximately 100 times higher than a correlation accumulation of the same received signal with a PRN code not in-phase (out-of-phase). Therefore, if a PRN code in several different phases (e.g., shifted various chips) are combined and then correlated with a signal, the correlation accumulation will be higher (e.g., approximately 100 times higher) if the phase of the received signal lines up with a phase of one of the PRN codes in the combination. That is, the correlation accumulation of a signal lining up in phase with one of the PRN codes in the combination will be approximately 100 times higher than the correlation accumulation of the signal not lining up in phase with any of the PRN codes in the combination.

Further, the base accumulation noise level will increase with the number of PRN codes combined together for the correlation. The expected increase of the base noise level will increase by sqrt(K), where K is the number of PRNs combined together. For example, if 128 different phases of a 10230 PRN code are combined together, the base noise level would be expected to increase by approximately 11.3 (sqrt(128)) to produce an expected noise floor of approximately 1144 (sqrt(10230)*sqrt(128)). This is still 10 times lower than the expected power level of an in-phase correlation (e.g., 10230) if any of the 128 PRN codes in the combination lines up with the phase of the signal.

BRIEF DESCRIPTION OF THE DRAWINGS

The description below refers to the accompanying drawings, of which:

FIGS. 3A-3C include exemplary tables for generating combinational PRN codes for an N bit symbol in accordance with an illustrative embodiment of the invention;

FIG. 6 includes an exemplary table for generating a combinational PRN code for a particular bit utilizing two different combinational PRN codes generated for the particular bit in accordance with an illustrative embodiment of the invention.

DETAILED DESCRIPTION OF AN ILLUSTRATIVE EMBODIMENT

Figure 1:
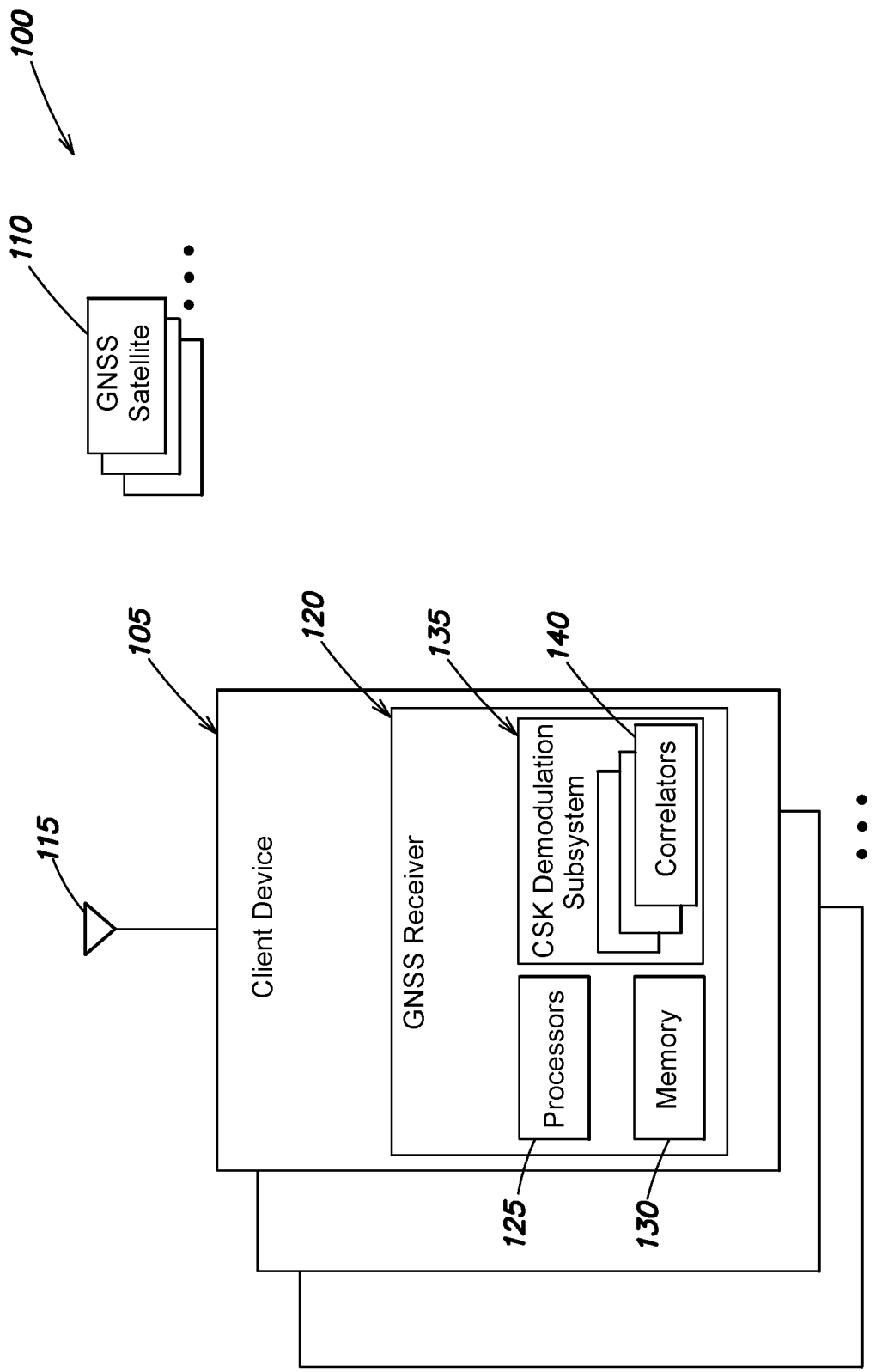
FIG. 1 depicts a system in accordance with an illustrative embodiment of the invention.

Referring to FIG. 1, a system 100 includes one or more client devices 105 and one or more Global Navigation Satellite System (GNSS) satellites 110 that transmit one or more GNSS satellite signals (not shown). The GNSS satellites 110 may be associated with one or more satellite navigation system such as, but not limited to, Galileo, Quasi-Zenith Satellite System (QZSS), BeiDou Navigation Satellite System (BDS), Global Positioning System (GPS), and/or GLONASS.

The client device 105 is typically capable of moving and includes an antenna 115 and a GNSS receiver 120, with one or more processors 125 and a memory 130. For example, the client device 105 may be a cellphone, laptop computer, portable computer, a personal digital assistant, etc. In addition, the GNSS receiver 120 may be a single, dual, or multi-frequency receiver.

The one or more processors 125 execute a code shift keying (CSK) demodulation subsystem 135, which includes a plurality of correlators 140, to demodulate CSK data from a satellite signal received at antenna 115 according to one or more embodiments described herein. Each of the plurality of correlators 140 may be a multi-bit or a single bit pseudo-random noise (PRN) correlator.

The CSK demodulation subsystem 135 utilizes combinational PRN codes generated for different bit positions of a CSK modulated symbol to demodulate the CSK data, as will be described in further detail below. As such, and in an embodiment, a total number of correlators 140 equal to the number of bits (N) of the CSK modulated symbol is required to demodulate the CSK data. For example, the CSK demodulation subsystem 135 utilizes a total of eight correlators 140 to demodulate the 8-bit symbol from the L6 signal. In a further embodiment, an additional dedicated correlator may be utilized to differentiate between a received signal and a lack of an input signal, as will be described in further detail below. In this further embodiment, a total number of correlators 140 equal to N plus one is required to demodulate the CSK data.

In an even further embodiment, the CSK demodulation subsystem utilizes two sets of combinational PRN codes generated for the N bit symbol to demodulate the CSK data, as will be described in further detail below. In this further embodiment, a total of N times two correlators are required to demodulate the CSK data.

The one or more processors 125 calculate position utilizing information from the GNSS signals (the timing of codes and carriers in the GNSS signals) received at the antenna 115 in conjunction with the demodulated CSK data to mitigate errors (e.g., orbit, clock, atmosphere, and/or multipath errors), resulting in the calculation of decimeter-level or better positioning accuracy. For example, the one or more processors 125 may demodulate CSK data (e.g., an 8-bit symbol) from 250 consecutive L6 4 ms signal sample sets to construct a message, e.g., an L6 navigation message that is 2000 bits, which may be utilized with an accurate positioning technique (e.g., Precise Point Positioning (PPP)).

The memory 130 may store one or more values associated with one or more embodiments described herein. For example, the memory 130 may store the fundamental PRN codes, where each fundamental PRN code is associated with a different GNSS satellite from which the GNSS receiver 120 receives satellite signals. In addition, the memory 130 may store receiver codes, combinational PRN codes, and one or more other values associated with the one or more embodiments described herein.

Figure 2:
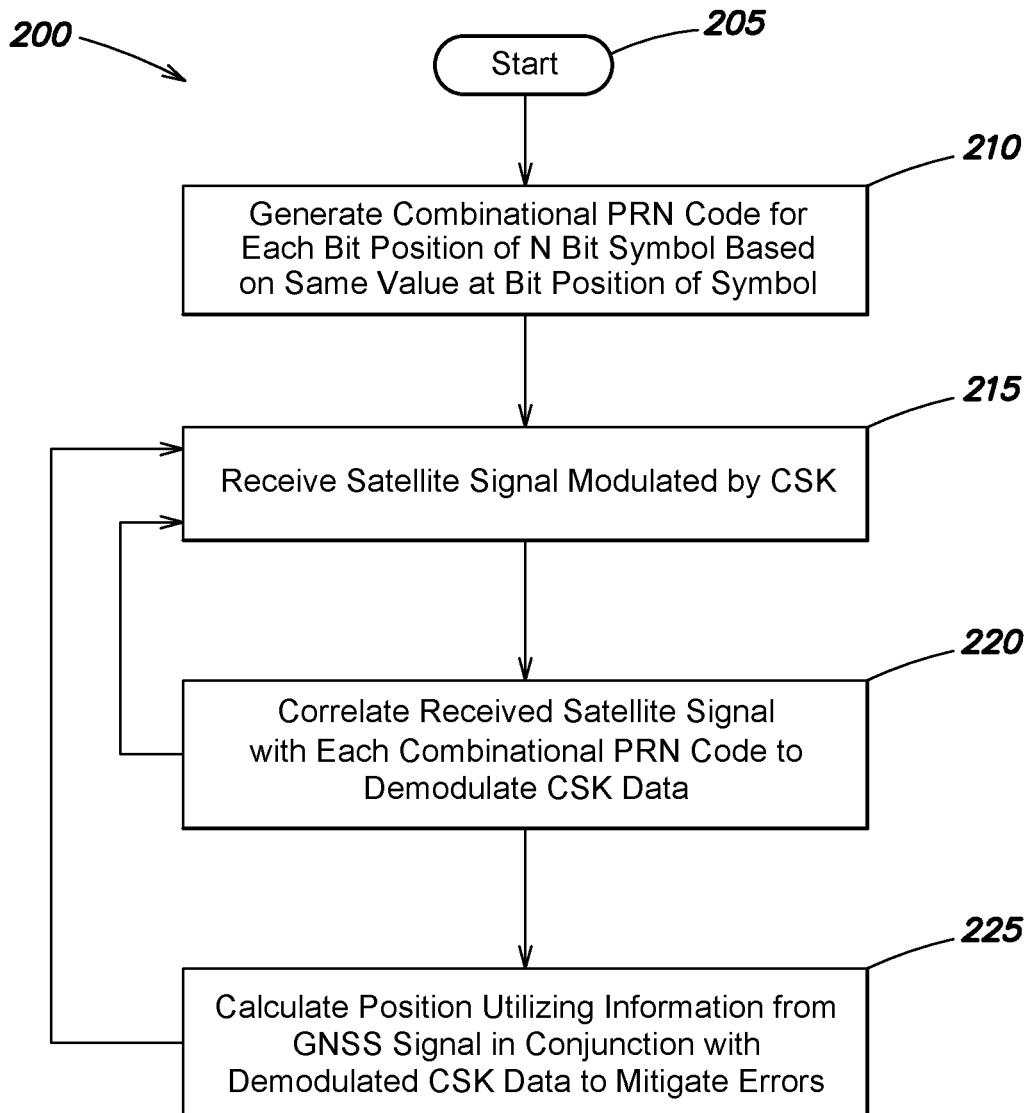
FIG. 2 is an exemplary flow chart for demodulating CSK data utilizing correlations with combinational PRN codes generated for each bit position based on a same value at the bit position in accordance with an illustrative embodiment of the invention.

FIG. 2 is an exemplary flow chart for demodulating CSK data utilizing correlations with combinational PRN codes generated each bit position based on a same value at the bit position in accordance with an illustrative embodiment of the invention. It should be understood that fewer or additional steps may be performed, and the steps may be performed in a different order.

The procedure 200 starts at step 205 and continues to step 210 where a CSK demodulation subsystem 135 generates a combinational PRN code for each bit position of the N bit symbol based on a same value at the bit position, where each combinational PRN code is a chip-by-chip summation (i.e., linear combination) of a group of receiver codes. Specifically, the GNSS receiver 120 may maintain, in memory 130, the fundamental PRN code and a plurality of receiver codes, where each of the plurality of receiver codes is the fundamental PRN code shifted a different selected number of chips. In this example, the CSK modulated symbol is 8-bits (N=8). As such, each of the plurality of receiver codes is the fundamental PRN code shifted a different number of chips from 1 to 255 to represent different possible CSK modulated symbols.

Specifically, the fundamental PRN code corresponds to the CSK modulated symbol of 00000000. The fundamental PRN code shifted one chip to the left is the receiver code that corresponds to the CSK modulated symbol of 00000001, the PRN code shifted two chips to the left is the receiver code that corresponds to the CSK modulated symbol of 00000010, etc. The PRN code shifted 255 chips to the left is the receiver code that corresponds to the CSK modulated symbol of 11111111.

Because the CSK modulated symbol is an 8-bit symbol, the CSK demodulation subsystem 135 generates a combinational PRN code for each of the eight bit positions. The receiver codes of the group, utilized in the chip-by-chip summation for a particular bit position, correspond to particular CSK modulated symbols that are set to a same value at the particular bit position (e.g., HIGH or LOW).

For example, a first combinational PRN code, generated for the first bit position, is a chip-by-chip summation of all the PRN codes shifted various amounts (e.g., receiver codes) where there is a 1 in the first bit position of the corresponding CSK modulated symbol. In other words, the first combinational PRN code represents a chip-by-chip summation of the fundamental PRN code shifted by odd numbers of chips (e.g., 1, 3, 5, 7 . . . 255).

Similarly, a second combinational PRN code, generated for the second bit position, is the chip-by-chip summation of all the PRN codes shifted various amounts (e.g., receiver codes) where there is a 1 in the second bit position of the corresponding CSK modulated symbol. In other words, the second combinational PRN code represents a chip-by-chip summation of the fundamental PRN code shifted by K chips where there is a 1 in the second bit of the K symbol where K has values of 2, 3, 6, 7, 10, 11 . . . 255. A combinational PRN code is generated for each other bit position of the CSK modulated symbol in a similar manner. As such, a first set of N combinational PRN codes is generated based on particular bit positions of particular CSK modulated symbols being set HIGH.

Figure 3A:
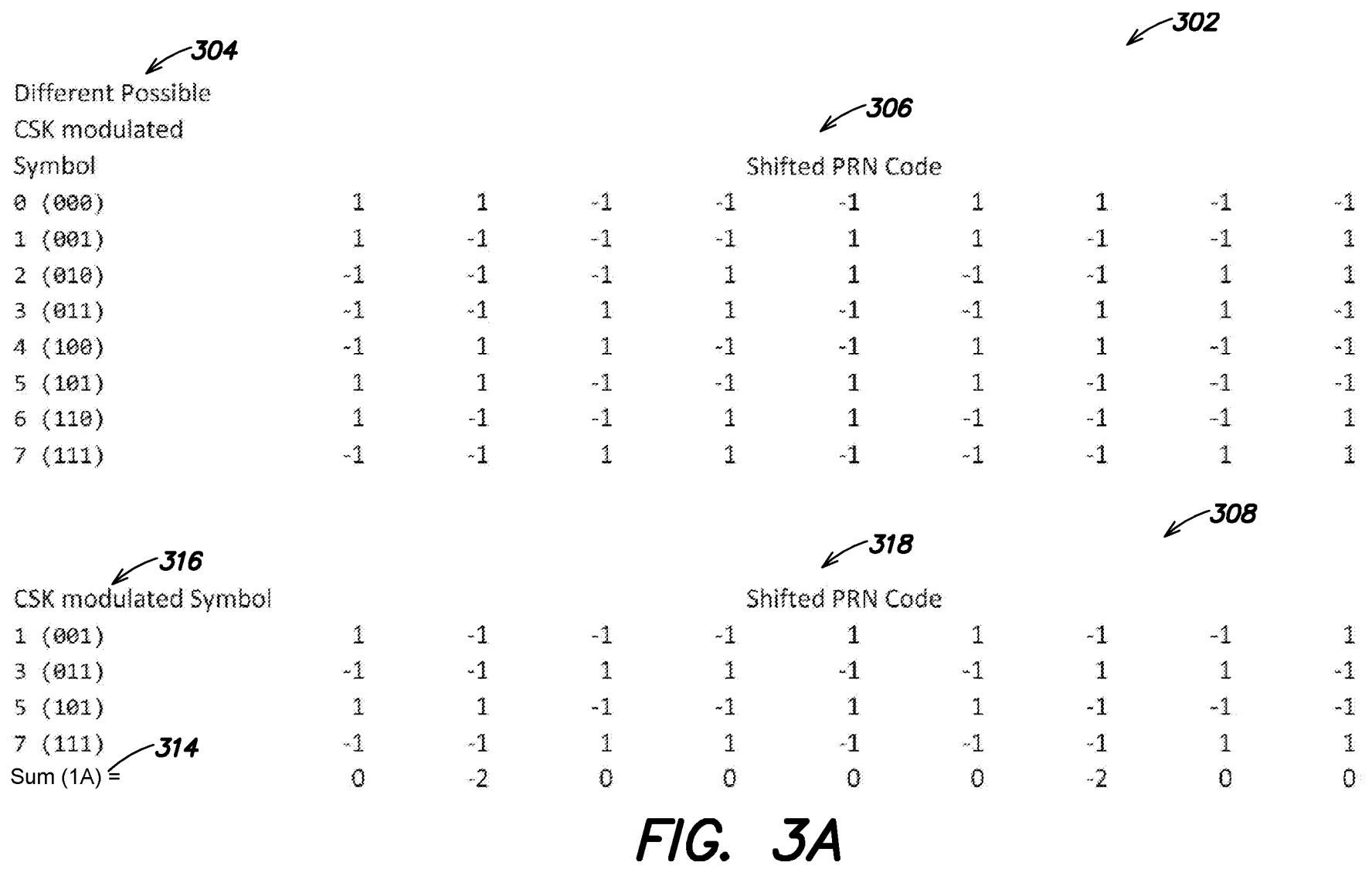
Figure 3B:
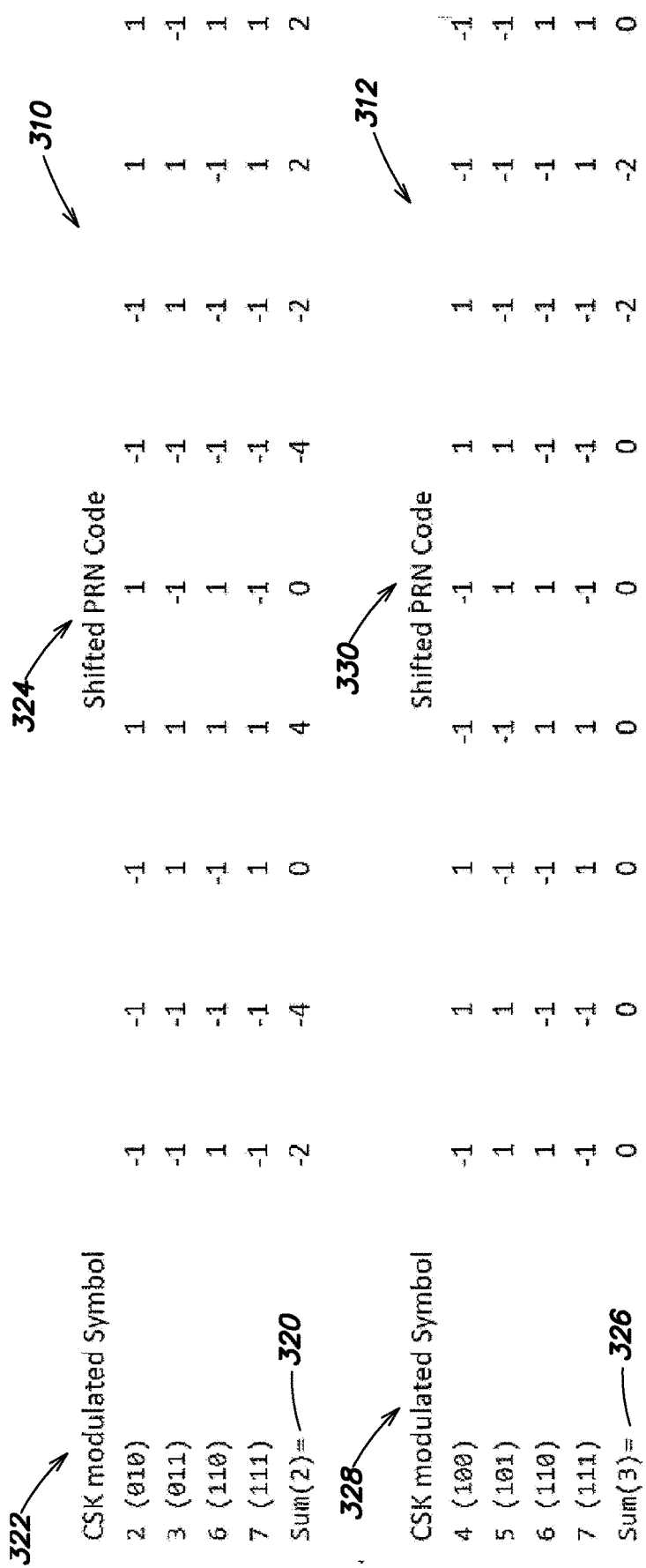

FIGS. 3A and 3B include exemplary tables for generating combinational PRN codes for each bit position of an N bit symbol. For simplicity purposes, the symbol utilized for FIGS. 3A and 3B is three bits and the PRN code is 9 chips. However, it is expressly contemplated that the technique described herein for generating combinational PRN codes may be utilized for a symbol having any number of bits and a PRN code having any number of chips. For example, the technique described herein may be utilized with an 8-bit CSK modulated symbol and a PRN code that is 10230 chips.

Specifically, the first table 302 includes column 304 entitled different possible CSK modulated symbol. Each of the eight rows in column 304 includes a different possible permutation of the CSK modulated symbol. Specifically, and because the symbol is 3 bits, there are eight different possible permutations of the CSK modulated symbol.

The first table 302 further includes a second column 306 entitled shifted PRN code. The first row of column 306 includes the fundamental PRN code and corresponds to CSK modulated symbol of 000. The second row of column 306 includes a receiver code that is the fundamental PRN code shifted one chip to the left and corresponds to the CSK modulated symbol of 001. The third row of column 306 includes a receiver code that is the fundamental PRN code shifted two chips to the left and corresponds to the CSK modulated symbol of 010. Rows four through eight of column 306 include different receiver codes, e.g., the fundamental PRN code shifted three through seven chips to the left, that respectively correspond to CSK modulated symbols of 011 through 111 as depicted in FIG. 3A.

FIGS. 3A and 3B further include tables 308, 310, and 312 that respectively depict the generation of the combinational PRN codes that are generated for each bit position of the 3-bit CSK modulated symbol.

Table 308 is a subset of table 302 and contains only rows of table 302 where the CSK modulated symbol contains a 1 in the first bit position, i.e., 1, 3, 5, and 7. For the first bit of the CSK modulated symbol and as depicted in table 308, the PRN codes shifted various amounts (e.g., receiver codes) that correspond to the CSK modulated symbols having a 1 at the first bit position (e.g., 001, 011, 101, and 111) are summed together in a chip-by-chip manner to generate the first combinational PRN code 314 for the first bit position (e.g., Sum (1A)). Column 316 and column 318 of table 308 respectively include the CSK modulated symbols that are set HIGH (e.g., 1) at the first bit position and the associated PRN code shifted various chips.

Table 310 is the subset of table 302 and contains only rows of table 302 where the CSK modulated symbol contains a 1 in the second bit position, i.e., 2, 3, 6, 7. For the second bit of the CSK modulated symbol and as depicted in table 310, the PRN codes shifted various amounts (e.g., receiver codes) that correspond to the CSK modulated symbols having a 1 at the second bit position (e.g., 010, 011, 110, and 111) are summed together in a chip-by-chip manner to generate the second combinational PRN code 320 for the second bit position (e.g., Sum (2)). Column 322 and column 324 of table 310 respectively include the CSK modulated symbols that are set HIGH (e.g., 1) at the second bit position and the associated PRN code shifted various chips.

Table 312 is the subset of table 302 and contains only rows of table 302 where the CSK modulated symbol contains a 1 in the third bit position, i.e., 4, 5, 6, 7. For the third bit of the CSK modulated symbol and as depicted in table 312, the PRN codes shifted various amounts (e.g., receiver codes) that correspond to the CSK modulated symbols having a 1 at the third bit position (e.g., 100, 101, 110, and 111) are summed together in a chip-by-chip manner to generate the third combinational PRN code 326 for the third bit position (e.g., Sum (3)). Specifically, column 328 and column 330 of table 312 respectively include the CSK modulated symbols that are set HIGH (e.g., 1) at the third bit position and the associated PRN code shifted various chips.

Thus, and based on particular bit positions of the CSK modulated symbols being set HIGH (e.g., 1), the first set of N combinational PRN codes may be generated that includes first combinational PRN code 314, second combinational PRN code 320, and third combinational PRN code 326.

It is noted that the chip values as depicted in FIGS. 3A and 3B are either 1 or −1 and for the combinational PRN codes described herein, the chip values depend on how many codes are being summed together. In the example of FIGS. 3A & 3B, where four PRN codes are being added together (N=3), each chip of the combinational code may vary between −4 and −4. Whereas if 128 different codes were added together, in the case of N=8, the chip values of the combinational code may range from −128 to 128. Although the chip values for the combinational PRN codes may be multiple bits in length and range from a value of −128 to 128, in a further embodiment, the combinational PRN codes may be reduced to a single bit. For example, the "sign" function (e.g., + or −) on the −128 to +128 values may be utilized to reduce the combinational PRN code to the single bit. This further embodiment would result in decreased performance, but simpler hardware, e.g., utilizing single bit PRN correlators.

FIGS. 3A and 3B includes exemplary tables utilized to generate the first set of combinational PRN codes based on particular bit positions of particular CSK modulated symbols being set HIGH (e.g., 1). However, it is expressly contemplated that a second set of combinational PRN codes may additionally or alternatively be generated, in a similar manner as described above, based on particular bit positions of particular CSK modulated symbols being set LOW (e.g., 0). Specifically, each receiver code utilized in the chip-by-chip summation for a particular bit position may correspond to a particular CSK modulated symbol that is set LOW at the particular bit position.

Figure 3C:
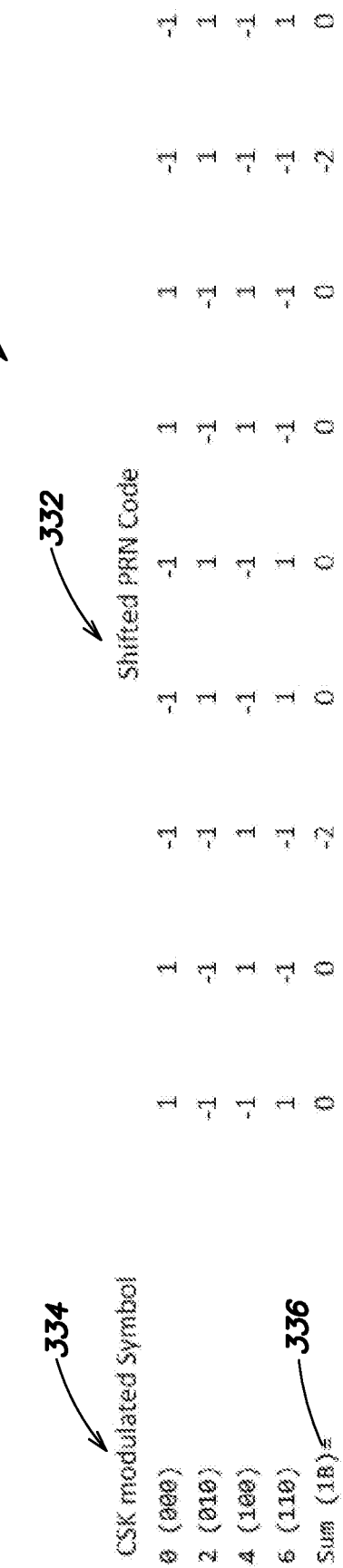

For example, a first combinational PRN code for the first bit position may be generated by performing a chip-by-chip summation of the PRN codes shifted various amounts (e.g., receiver codes) 332 that correspond to the CSK modulated symbols 334 having a 0 at the first bit position (e.g., 000, 010, 100, and 110) as depicted in table 338 of FIG. 3C. The chip-by-chip summation generates a first combinational PRN code 336 for the second set of combinational PRN codes for the first bit position (e.g., Sum (1B)).

Similarly, a second combinational PRN code for the second bit position (not shown) may be generated by performing a chip-by-chip summation of the PRN codes shifted various amounts (e.g., receiver codes) that correspond to the CSK modulated symbols having a 0 at the second bit position (e.g., 000, 001, 100, and 101). In addition, a third combinational PRN code for the third bit position (not shown) is generated by performing a chip-by-chip summation of the PRN codes shifted various amounts (e.g., receiver codes) that correspond to the CSK modulated symbols having a 0 at the third bit position (e.g., 000, 001, 010, and 011). Thus, and based on particular bit positions of the CSK modulated symbols being set LOW (e.g., 0), the second set of N combinational PRN codes may be generated.

The procedure continues to step 215 where a GNSS receiver 120, at a client device 105, receives a satellite signal that is modulated by CSK. The satellite signal may be an L6 signal that includes Code 1 of 10230 chips that is modulated by CSK to represent an N bit symbol. If the L6 signal is an L61 signal, it may also include Code 2 (e.g., pilot channel). If the L6 signal is an L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000101 (i.e., a binary representation of 5).

Figure 4:
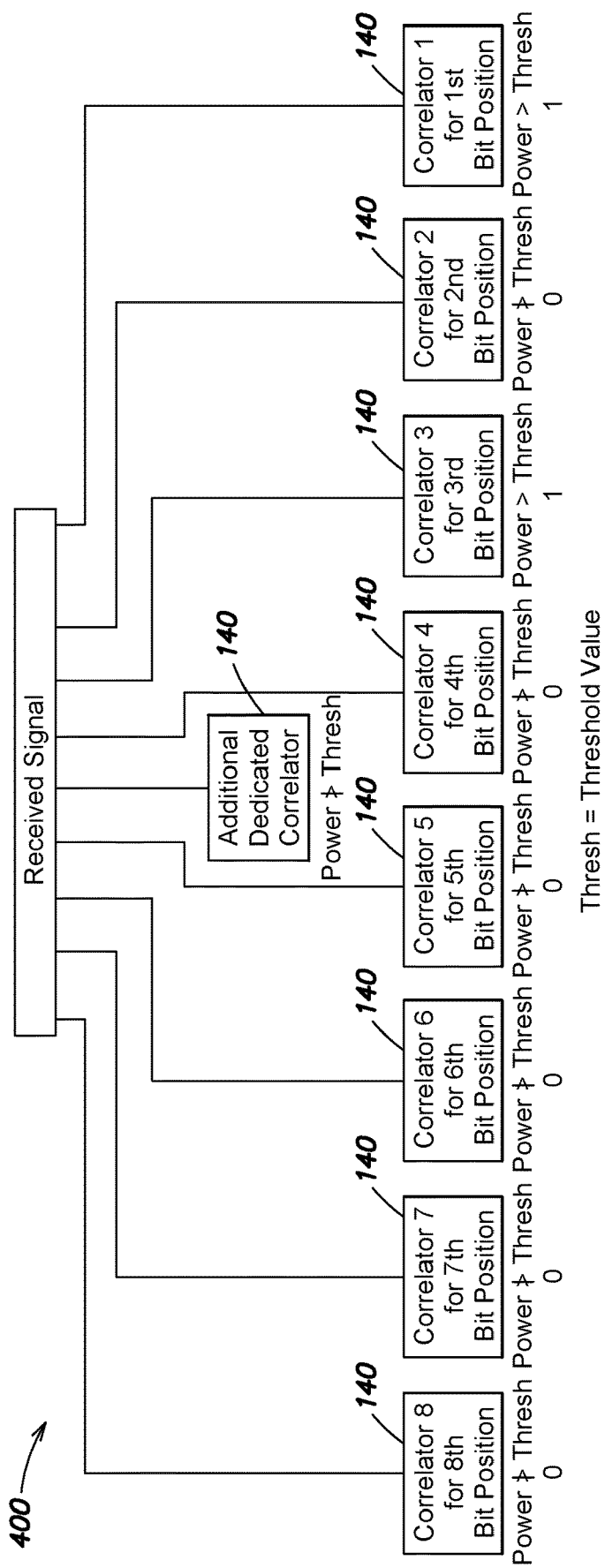
FIG. 4 is a schematic diagram utilizing a total number of correlators based on a number of bits of a CSK modulated symbol to demodulate the CSK data in accordance with an illustrative embodiment of the invention.

The procedure continues to step 220 where the CSK demodulation subsystem 135 correlates the received satellite signal, which includes Code 1 modulated by CSK, with each of the combinational PRN codes of the first set of combinational PRN codes or the second set of combinational PRN codes to demodulate the CSK data. Specifically, the CSK demodulation subsystem 135 utilizes a different correlator 140 for each bit position to correlate the L6 signal with each combinational PRN of the first set or the second set of combinational PRN codes stored in memory 130. For example, and as depicted in FIG. 4, the CSK demodulation subsystem 135 utilizes a different correlator 140 to correlate the L6 signal with each combinational PRN code of the first set of combinational PRN codes.

More specifically, the CSK demodulation subsystem 135 utilizes a first correlator 140 to correlate the received signal with the first combinational PRN code generated for the first bit position. For example, the correlation may be the dot product of Code 1 modulated by CSK in the received signal and the first combinational PRN code. In addition, the CSK demodulation subsystem 135 utilizes a second correlator 140 to correlate the received signal with the second combinational PRN code generated for the second bit position. Similarly, the CSK demodulation subsystem utilizes six additional correlators 140, as depicted in FIG. 4, to correlate the received signal with the remaining combinational PRN codes (e.g., the third combinational PRN code through the eighth combinational PRN code) generated for the remaining bit positions (e.g., the third bit position through the eighth bit position). Alternatively, a single multiplexed correlator may be utilized to correlate the received signal with each of the combinational PRN codes generated for a different bit position of the CSK modulated symbol.

The CSK demodulation subsystem then determines the CSK modulated symbol based on the binary value produced by the correlations utilizing the first set of combinational PRN codes. Specifically, if a correlator 140 has a power level value that is greater than a power threshold value based on the expected correlation value, it is determined that the bit position corresponding to the correlator 140 and for the produced binary value is HIGH. For example, if a power level value of the dot product of the received signal and the combinational PRN code generated for the first bit position is greater than the power threshold value, it is determined that the first bit position for the produced binary value is HIGH. Similarly, if a correlator 140 has a power level value that is not greater than the power threshold value based on the expected correlation value, it is determined that the bit position corresponding to the correlator 140 and for the produced binary value is LOW.

In an embodiment and to distinguish between a produced binary value of 00000000 (e.g., binary representation of 0) based on the correlations and a lack of an input signal, an additional dedicated correlator 140 may be utilized for the fundamental PRN code (e.g., the un-shifted PRN code). If a power level value of the additional dedicated correlator 140 is greater than the power threshold value based on the correlation of the received signal and the fundamental PRN code, it is determined that the CSK demodulated symbol in the L6 signal is zero (e.g., 00000000) and not a lack of an input signal. That is, and with the lack of the input signal, the respective power level values of the eight correlators 140 and the additional dedicated correlator 140 based on the correlations are not greater than the power threshold value. Therefore, and in this further embodiment, a total number of correlators required to demodulate the CSK data is equal to N plus one.

If the L6 signal is an L61 signal, the power threshold value may be based on a measured carrier-to-noise (C/N) ratio. Specifically, and after the pilot channel has been phase locked, the CSK demodulation subsystem 135 may measure the C/N ratio of the pilot channel that utilized to produce the power threshold value. Alternatively, the power threshold value may be related to the C/N of the pilot channel. In addition and when the L6 signal is an L61 signal, the additional dedicated correlator 140 may be used to as part of a phase lock loop (PLL) that locks the data collection process to the phase of the broadcast symbols and ensures that the signal power is greater than the power threshold value.

If the L6 signal is an L62 signal which does not include the pilot channel, the power threshold value may be based on the fundamental PRN code (i.e., the un-shifted PRN code). Specifically, the CSK demodulation subsystem 135 may measure the power level associated with the additional dedicated correlator utilized for the fundamental PRN code, and the power threshold value may be based on the measured power level. In addition, the QZSS L1 signal from the same satellite transmitting the L62 signal may be tracked in a separate GNSS channel. The information from the tracked L1 signal may be used with the fundamental PRN code (i.e., the un-shifted PRN code) to run a phase lock loop and align a delay lock loop.

FIG. 4 is a schematic diagram utilizing a total number of correlators based on a number of bits of the CSK modulated symbol to demodulate the CSK data. Specifically, and as depicted in FIG. 4, the received L6 signal, which includes Code 1 modulated by CSK, is correlated (e.g., dot product) with each combinational PRN code of the first set of combinational PRN codes utilizing the eight different correlators.

The CSK demodulation subsystem then determines which correlators 140 have a power level value greater than the power threshold value and which correlators 140 do not have a power level value greater than the power threshold value based on the correlations to produce the binary value that is the CSK modulated symbol, i.e., the 8-bit symbol. Specifically, the correlator 140 that has a power level value that is greater than the power threshold value based on the correlation (e.g., dot product) indicates that the corresponding bit for the produced binary value is HIGH. In addition, the correlator 140 that has a power level value that is not greater than the power threshold value based on the correlation indicates that the corresponding bit for the produced binary value is LOW. For this example and as depicted in FIG. 4, it is determined that correlators one and three have respective power level values that are greater than the power threshold value based on the correlations of the received signal and the combinational PRN codes generated for the first bit position and the third bit position. As such, bit positions one and three for the produced binary value are determined to be HIGH.

In addition and in this example, it is determined that correlator two and correlators four through eight have respective power level values that are not greater than the power threshold value based on the correlations of the receive signal and the combinational PRN codes generated for bit position two and bit positions four through eight. As such, bit position two and bit positions four through eight for the produced binary value are determined to be LOW.

Further and in this example, it is determined that the additional dedicated correlator 140 has a power level value that is not greater than the power threshold value based on the correlation of the received signal and the fundamental PRN code. Therefore, a binary value of 00000101 is produced based on the correlations. The produced binary value is the determined CSK modulated symbol, i.e., the demodulated CSK data.

In a further embodiment, and when utilizing the second set of combinational PRN codes, the CSK demodulation subsystem 135 utilizes N different correlators 140 to correlate the received signal with each combinational PRN code of the second set of combinational PRN codes. If a correlator has a power level value that is greater than the power threshold value based on the expected correlation value, it is determined that the bit position corresponding to the correlator 140 and for the produced binary value is LOW. If a correlator has a power level value that is not greater than the power threshold value based on the expected correlation value, it is determined that the bit position corresponding to the correlator 140 and for the produced binary value is HIGH. The produced binary value based on the correlations of the received signal with each combinational PRN code of the second set of combinational PRN codes is the determined CSK modulated symbol, i.e., the demodulated CSK data.

In this further embodiment, an additional dedicated correlator may be utilized for the fundamental PRN code shifted 255 chips to the left to distinguish between a produced binary value of 11111111 (e.g., binary representation of 255) based on the correlations and a lack of an input signal. The received signal may then be correlated with the fundamental PRN code shifted 255 chips to the left utilizing the additional dedicated correlator. If the additional dedicated correlator has a power level value that is greater than the power threshold value, it is determined that the CSK modulated symbol in the L6 signal is 255 (e.g., 11111111) and not a lack of an input signal. Thus, a total number of correlators required to demodulate the CSK data is N plus one.

From step 220, the procedure may continue to step 215 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated combinational PRN codes, stored in memory 130, every 4 ms to demodulate the CSK data from 250 consecutive L6 signal sample sets in the manner described above.

Alternatively, from step 220, the procedure may continue to step 225 where the one or more processors 125, of the GNSS receiver 120, calculate position utilizing information from the GNSS signals (e.g., the timing of codes and carriers in the GNSS signals) received at the antenna 115 in conjunction with the demodulated CSK data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 215 where the receiver 120 may receive additional signals, and demodulate the CSK data and determine position in the manner described above. For example, and after one second and demodulating the entirety of the L6 message, the GNSS receiver may receive additional signals and demodulate the CSK data and determine position in the manner described above.

Figure 5:
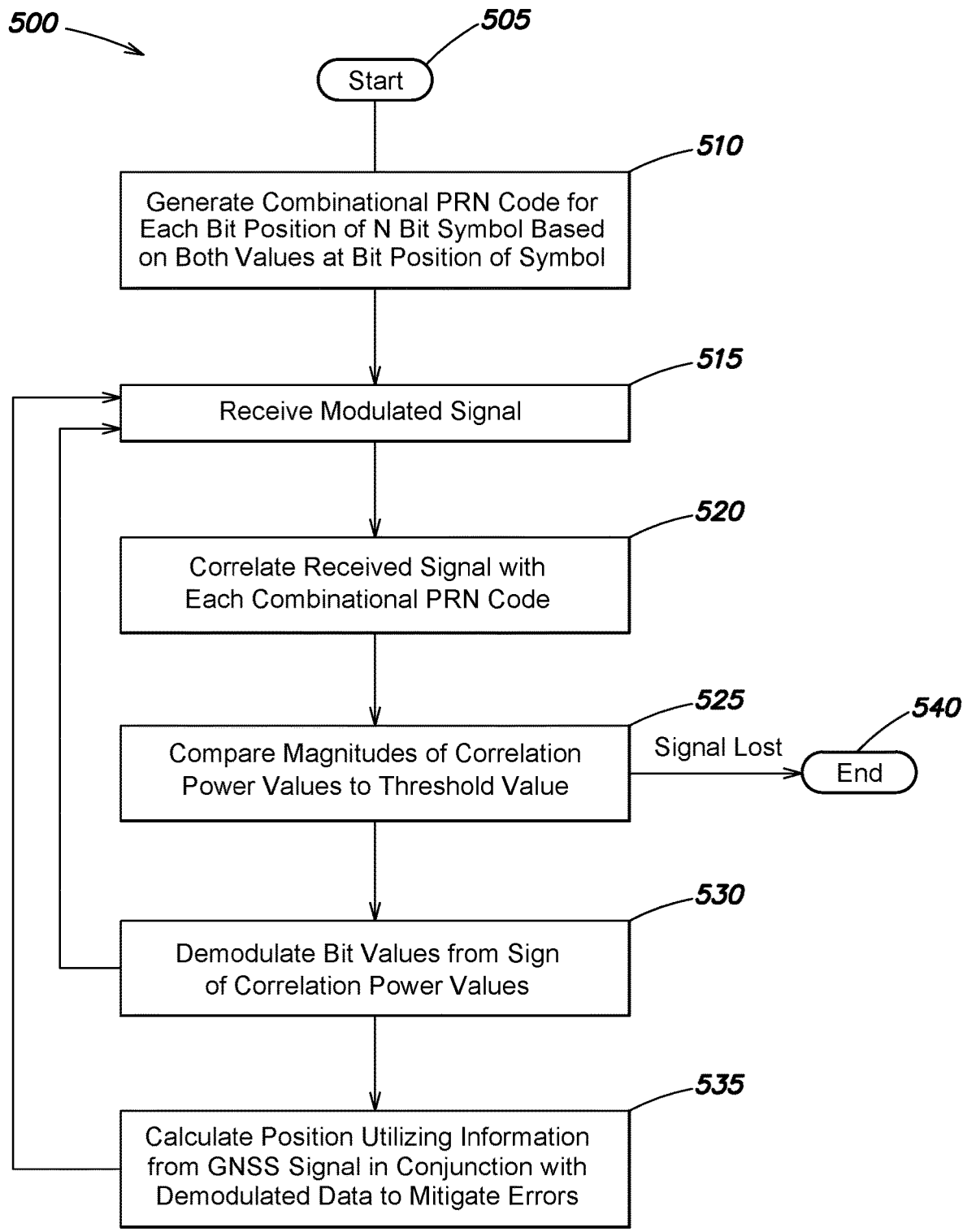
FIG. 5 is an exemplary flow chart for demodulating CSK data utilizing correlations with combinational PRN codes generated for each bit position based on both values at the bit position in accordance with an illustrative embodiment of the invention.

FIG. 5 is an exemplary flow chart for demodulating CSK data utilizing correlations with combinational PRN codes generated for each bit position based on both values at the bit position in accordance with an illustrative embodiment of the invention. It should be understood that fewer or additional steps may be performed, and the steps may be performed in a different order.

The procedure 500 starts at step 505 and continues to step 510 where a CSK demodulation subsystem 135 generates a combinational PRN code for each bit position of the N bit symbol based on both values (e.g., 0 and 1) at the particular bit position. For example, the CSK demodulation subsystem 135 may generate a first set of N combinational PRN codes and a second set of N combinational PRN codes for the N bit symbol. Specifically, and as described above with reference to FIGS. 2 and 3A-3C, the first set of combinational PRN codes may be generated based on particular bit positions of particular CSK modulated symbols being set HIGH (e.g., 1). More specifically, each receiver code utilized in the chip-by-chip summation for a particular bit position corresponds to a particular CSK modulated symbol that is set HIGH at the particular bit position. For example, and with reference to FIG. 3A, a first combinational PRN code of the first set of combinational PRN codes may be generated based on a chip-by-chip summation of the receiver codes that correspond to the CSK modulated symbols that are set HIGH at the first bit position (e.g., combinational PRN code 314 that is Sum (1A)).

In addition, the second set of N combinational PRN codes may be generated based on particular bit positions of particular CSK modulated symbols being set LOW (e.g., 0). Specifically, each receiver code utilized in the chip-by-chip summation for a particular bit position may correspond to a particular CSK modulated symbol that is set LOW at the particular bit position. For example, and with reference to FIG. 3C, a first combinational PRN code 336 of the second set of combinational PRN codes may be generated based on a chip-by-chip summation of the receiver codes that correspond to the CSK modulated symbols that are set LOW at the first bit position (e.g., combinational PRN code 336 that is Sum (1B)).

The CSK demodulation subsystem 135 then performs a chip-by-chip difference (i.e., linear combination) of the second set of combinational PRN codes from the first set of combinational PRN codes for each bit position to generate a third set of combinational PRN codes. For example, and as depicted in FIG. 6, the CSK demodulation subsystem 135 subtracts the first combinational PRN code 336 of the second set from the first combinational PRN code 314 of the first set to generate the first combinational PRN code of the third set and for the first bit position. Specifically, and as depicted in FIG. 6, sum (1B) is subtracted from sum (1A) to generate the first combinational PRN code 340 (e.g., sum (1C)) for the first bit position and for the third set of the combinational PRN codes. For an 8-bit symbol, the CSK demodulation subsystem would perform similar differences for each remaining bit of the 8-bit symbol.

Instead of generating the first and second set of combinational PRN codes, the CSK demodulation subsystem 135 may generate each combinational PRN code for a particular bit position and for the third set by performing a chip-by-chip addition (i.e., linear combination) of the receiver codes where the particular bit position is set HIGH while performing a chip-by-chip subtraction (i.e., linear combination) of the receiver codes where the particular bit position is set LOW.

For example, and for the first bit position with reference to table 302, the receiver codes that correspond to the CSK modulated symbols of 001, 011, 101, 111 (i.e., set HIGH at the first bit position) are added (in a chip-by-chip manner) while the receiver codes that correspond to CSK modulated symbols of 000, 010, 100, 110 (i.e., set LOW at the first bit position) are subtracted (in a chip-by-chip manner) to generate the first combinational PRN code (e.g., 0, −2, 2, 0, 0, 0, −2, 2, 0) for the first bit position and for the third set of combinational PRN codes. It is noted that the first combinational PRN code for the first bit position and for the third set correspond to Sum (1C) in FIG. 6.

Similarly, and for the second bit position with reference to table 302, the receiver codes that correspond to the CSK modulated symbols of 010, 011, 110, 111 (i.e., set HIGH at the second bit position) are added (in a chip-by-chip manner) while the receiver codes that correspond to CSK modulated symbols of 000, 001, 100, 101 (i.e., set LOW at the second bit position) are subtracted (in a chip-by-chip manner) to generate a second combinational PRN code for the second bit position and for the third set of combinational PRN codes. Further, for the third bit position with reference to table 302, the receiver codes that correspond to the CSK modulated symbols of 100, 101, 110, 111 (i.e., set HIGH at the third bit position) are added (in a chip-by-chip manner) while the receiver codes that correspond to CSK modulated symbols of 000, 001, 010, 011 (i.e., set LOW at the third bit position) are subtracted (in a chip-by-chip manner) to generate a third combinational PRN code for the third bit position and for the third set of combinational PRN codes.

The procedure continues to step 515 where a GNSS receiver 120, at a client device 105, receives a modulated signal. The modulated signal may be an L6 signal that includes Code 1 of 10230 chips that is modulated by CSK to represent an N bit symbol. If the L6 signal is an L61 signal, it may also include Code 2 (e.g., pilot channel). If the L6 signal is an L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000100 (i.e., a binary representation of 4).

The procedure continues to step 520 where the CSK demodulation subsystem 135 correlates the received modulated signal with each combinational PRN code of the third set of combinational PRN codes. Specifically, the received signal is correlated with each combinational PRN code of the third set of combinational PRN codes utilizing N correlators. Each correlator 140, of the N correlators and utilized for a different bit position, has an associated correlation power level value.

The procedure continues to step 525 where the CSK demodulation subsystem 135 compares the magnitudes of the correlation power level values with a threshold value to determine the presence of a signal. For example, the CSK demodulation subsystem 135 may sum the magnitudes of the correlation power level values at each bit position and compare the sum to the threshold value to determine the presence of the signal. Alternatively, the CSK demodulation subsystem 135 may compare any individual magnitude or a combination of any of a plurality of magnitudes to a threshold value to determine the presence of the signal. It is noted that the threshold value may, for example, be set by a user or determined in any of a variety of different ways. If the input signal is determined not to be present, the procedure ends at step 540. If the signal is determined to be present, the procedure continues to 530.

At step 530, the CSK demodulation subsystem 135 demodulates each bit of the symbol from the sign of the correlation power level values. If the correlation power level value for a particular bit position is greater than zero, the particular bit position is determined to be HIGH. If the correlation power level value for a particular bit position is less than zero, the particular bit position is determined to be LOW.

In this example, it is determined that the correlation power level values for bit position three is greater than zero, while the correlation power level values for bit positions one, two, and four through eight are less than zero. Therefore, and for a produced binary value, it is determined that bit position three is HIGH and bit positions one, two, and four through eight are LOW. Therefore, a binary value of 00000100 is produced. The produced binary value is the determined CSK modulated symbol, i.e., the demodulated CSK data. Accordingly, and in this example, a total of eight correlators are utilized to demodulate the CSK data.

From step 530, the procedure may continue to step 515 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated third set of combinational PRN codes, stored in memory 130, every 4 ms to demodulate the CSK data from 250 consecutive L6 signal sample sets in the manner described above.

Alternatively, from step 530, the procedure may continue to step 535 where the one or more processors 125, of the GNSS receiver 120, calculate position utilizing information from the GNSS signals (e.g., the timing of codes and carriers in the GNSS signals) received at the antenna 115 in conjunction with the demodulated data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 515 where the receiver 120 may receive additional signals, and demodulate the CSK data and determine position in the manner described above. For example, and after one second and demodulating the entirety of the L6 message, the GNSS receiver may receive additional signals and demodulate the CSK data and determine position in the manner described above.

Figure 7:
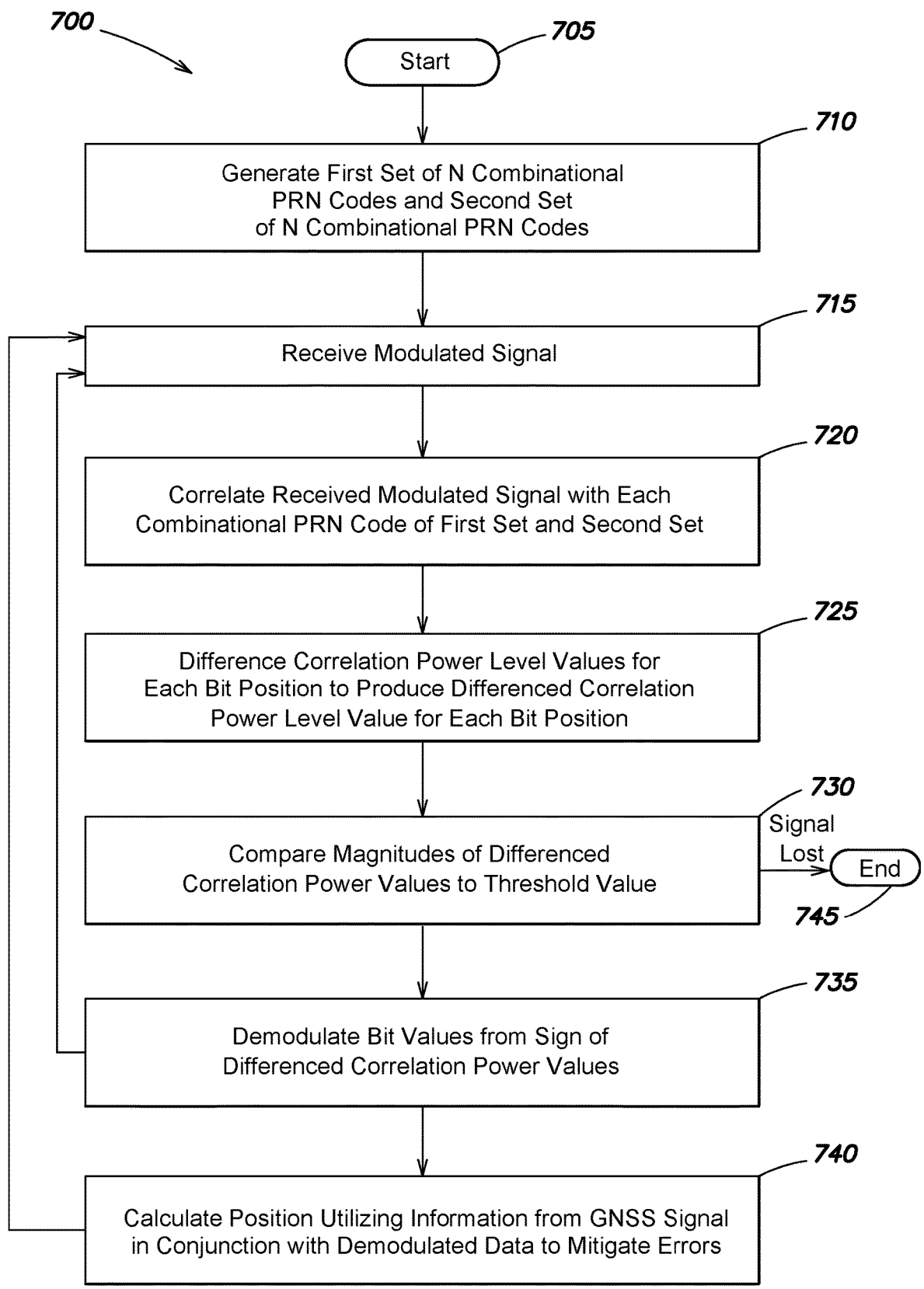
FIG. 7 is an exemplary flow chart for demodulating CSK data utilizing correlations with two sets of combinational PRN codes generated for an N bit symbol in accordance with an illustrative embodiment of the invention.

FIG. 7 is an exemplary flow chart for demodulating CSK data utilizing correlations with two sets of combinational PRN codes generated for an N bit symbol in accordance with an illustrative embodiment of the invention. It should be understood that fewer or additional steps may be performed, and the steps may be performed in a different order.

The procedure 700 starts at step 705 and continues to step 710 where a CSK demodulation subsystem 135 generates a first set of N combinational PRN codes and a second set of N combinational PRN codes for the N bit symbol. Specifically, and as described above with respect to FIGS. 2, 3A, and 3B, the first set of combinational PRN codes may be generated based on particular bit positions of particular CSK modulated symbols being set HIGH (e.g., 1). More specifically, each receiver code utilized in the chip-by-chip summation for a particular bit position corresponds to a particular CSK modulated symbol that is set HIGH at the particular bit position.

In addition, the second set of N combinational PRN codes may be generated based on particular bit positions of particular CSK modulated symbols being set LOW (e.g., 0). Specifically, each receiver code utilized in the chip-by-chip summation for a particular bit position may correspond to a particular CSK modulated symbol that is set LOW at the particular bit position.

The procedure continues to step 715 where a GNSS receiver 120, at a client device 105, receives a modulated signal. The modulated signal may be an L6 signal that includes Code 1 of 10230 chips that is modulated by CSK to represent an N bit symbol. If the L6 signal is an L61 signal, it may also include Code 2 (e.g., pilot channel). If the L6 signal is an L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000011 (i.e., a binary representation of 3).

The procedure continues to step 720 where the CSK demodulation subsystem 135 correlates the received modulated signal with each combinational PRN code of the first set of combinational PRN codes and the second set of combinational PRN codes. Specifically, the received signal is correlated with each combinational PRN code of the first set of combinational PRN codes utilizing N correlators. Each correlator 140, of the N correlators and utilized for a different bit position, has an associated first correlation power level value. In addition, the received signal is correlated with each combinational PRN code of the second set of combinational PRN codes utilizing N additional correlators. Each correlator 140, of the N additional correlators and utilized for a different bit position, has an associated second correlation power level value.

The procedure continues to step 725 where the CSK demodulation subsystem 135 differences the correlation power level values for each bit position to produce a differenced correlation power level value for each bit position. Specifically, and for each bit position of the CSK modulated symbol, the CSK demodulation subsystem 135 subtracts the second correlation power level value from the first correlation power level produced for the same bit position.

For example, and for an 8-bit symbol, the CSK demodulation subsystem 135 subtracts the second correlation power level value for the first bit position from the first correlation power level value for the first bit position to produce a differenced correlation power level value for the first bit position. Similarly, the CSK demodulation subsystem 135 subtracts the second correlation power level value for the second bit position from the first correlation power level value for the second bit position to produce a differenced correlation power level value for the second bit position. The CSK demodulation subsystem 135 performs similar subtractions for bit positions three through eight to produce differenced correlation power level values for bit positions three through eight.

The procedure continues to step 730 where the CSK demodulation subsystem 135 compares the magnitudes of the differenced correlation power level values with a threshold value to determine the presence of a signal. For example, the CSK demodulation subsystem 135 may sum the magnitudes of the differenced correlation power level values at each bit position and compare the sum to the threshold value to determine the presence of the signal. Alternatively, the CSK demodulation subsystem 135 may compare any individual magnitude or a combination of any of a plurality of magnitudes to a threshold value to determine the presence of the signal. It is noted that the threshold value may, for example, be set by a user or determined in any of a variety of different ways. If the input signal is determined not to be present, the procedure ends at step 745. If the signal is determined to be present, the procedure continues to 735.

At step 735, the CSK demodulation subsystem 135 demodulates each bit of the symbol from the sign of the differenced correlation power level values. If the differenced correlation power level value for a particular bit position is greater than zero, the particular bit position is determined to be HIGH. If the differenced correlation power level value for a particular bit position is less than zero, the particular bit position is determined to be LOW.

In this example, it is determined that the differenced correlation power level values for bit positions one and two are greater than zero, while the differenced correlation power level values for bit positions three through eight are less than zero. Therefore, and for a produced binary value, it is determined that bit positions one and two are HIGH and bit positions three through eight are LOW. Therefore, a binary value of 00000011 is produced. The produced binary value is the determined CSK modulated symbol, i.e., the demodulated CSK data. Accordingly, and in this example, a total of sixteen correlators are utilized to demodulate the CSK data.

From step 735, the procedure may continue to step 715 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated first and second set of combinational PRN codes, stored in memory 130, every 4 ms to demodulate the CSK data from 250 consecutive L6 signal sample sets in the manner described above.

Alternatively, from step 735, the procedure may continue to step 740 where the one or more processors 125, of the GNSS receiver 120, calculate position utilizing information from the GNSS signals (e.g., the timing of codes and carriers in the GNSS signals) received at the antenna 115 in conjunction with the demodulated data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 715 where the receiver 120 may receive additional signals, and demodulate the CSK data and determine position in the manner described above. For example, and after one second and demodulating the entirety of the L6 message, the GNSS receiver may receive additional signals and demodulate the CSK data and determine position in the manner described above.

The foregoing description described certain example embodiments. It will be apparent, however, that other variations and modifications may be made to the described embodiments, with the attainment of some or all of their advantages. For example, although the CSK demodulation subsystem 135 is depicted as being within the GNSS receiver 120, it is expressly contemplated that the CSK demodulation subsystem 135 may be a separate component of the client device 105 and may be executed by the processing capabilities of the client device 105. In addition, although reference is made to demodulating an 8-bit symbol and the fundamental PRN code being shifted various chips to the left, it is expressly contemplated that the symbol may be any number of bits and the fundamental PRN code may be shifted various chips to the right. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. An apparatus for demodulating code shift keying (CSK) data, the apparatus comprising:
   a processor;
   a CSK demodulation subsystem executed by the processor and configured to:
   receive a signal including a predetermined code modulated by CSK to represent a symbol,
   generate a combinational code for each different bit position of the symbol, wherein each combinational code is a chip-by-chip linear combination of a group of receiver codes of a plurality of receiver codes, and wherein each of the plurality of receiver codes is the predetermined code shifted a different number of chips,
   correlate the received signal with each combinational code generated for each bit position to produce a binary value, and
   determine the symbol based on the binary value produced from the correlation of the received signal with each combinational code.

2. The apparatus of claim 1, wherein the predetermined code is a pseudo-random noise (PRN) code and the received signal is received from a Global Navigation Satellite Signal (GNSS) satellite associated with the Quasi-Zenith Satellite System (QZSS).

3. The apparatus of claim 1, wherein
   each receiver code of the group, utilized for the chip-by-chip linear combination for a particular bit position, corresponds to a particular symbol of a plurality of different symbols that is set high at the particular bit position, or
   each receiver code of the group, utilized for the chip-by-chip linear combination for a particular bit position, corresponds to a particular symbol of the plurality of different symbols that is set low at the particular bit position, or
   each receiver code in the group that corresponds to a first particular symbol that is set high at a first particular bit position is added while each receiver code in the group that corresponds to a second particular symbol that is set low at the first particular bit position is subtracted.

4. The apparatus of claim 1, wherein the binary value is an 8-bit binary value and wherein the symbol is associated with an L6 message that is 2000 bits.

5. The apparatus of claim 1, wherein each chip of the combinational code for each different bit position of the symbol is multiple bits or a single bit.

6. The apparatus of claim 1, wherein a different correlator is utilized to correlate the received signal with each of the combinational codes or one or more multiplexed correlators are utilized to correlate the received signal with each of the combinational codes.

7. The apparatus of claim 1, wherein the CSK demodulation subsystem is further configured to:
   compare a correlation power level with a power threshold value, wherein the correlation power level is obtained based on the correlation of the received signal with a particular combinational code generated for a particular bit position of the symbol,
   determine that the particular bit position of the binary value is set high in response to determining that the correlation power level is greater than the power threshold value, and
   determine that the particular bit position of the binary value is set low in response to determining that the correlation power level is not greater than the power threshold value.

8. The apparatus of claim 1, wherein the CSK demodulation subsystem is further configured to:
   compare a correlation power level with a power threshold value, wherein the correlation power level is obtained based on the correlation of the received signal with a particular combinational code generated for a particular bit position of the symbol, determine that the particular bit position of the binary value is set low in response to determining that the correlation power level is greater than the power threshold value, and determine that the particular bit position of the binary value is set high in response to determining that the correlation power level is not greater than the power threshold value.

9. The apparatus of claim 1, wherein the correlation between the received signal with each combinational code corresponding to each different bit position produces a positive or a negative value for each different bit position, and the positive value indicates that a bit position is set high for the produced binary value the negative value indicates that the bit position is set low for the produced binary value.

10. A method for demodulating data, comprising:

receiving, at a receiver, a modulated signal representing a symbol having N number of bits;

generating a first combinational code for each of the N number of bits of the symbol by performing a chip-by-chip linear combination of a first group of a plurality of receiver codes, wherein each receiver code of the plurality of receiver codes is a predetermined code shifted a different number of chips;

generate a second combinational code for each of the N number of bits of the symbol by performing a chip-by-chip linear combination of a second group of the plurality of receiver codes;

correlating the modulated signal with each of the first combinational codes to produce a first correlation power level value for each of the N bits;

correlating the modulated signal with each of the second combinational codes to produce a second correlation power level value for each of the N bits;

calculating a differenced correlation power level value for each of the N bits utilizing the first correlation power level value for each of the N bits and the second correlation power level value for each of the N bits;

demodulating a value for each of the N bits of the symbol from a sign of the differenced correlation power level value for each of the N bits of the symbol to produce a binary value; and determining the symbol based on the produced binary value.

11. The method of claim 10, wherein the predetermined code is a pseudo-random noise (PRN) code and wherein the modulated signal is received from a Global Navigation Satellite Signal (GNSS) satellite associated with the Quasi-Zenith Satellite System (QZSS).

12. The method of claim 10, wherein each receiver code of the first group, utilized for the chip-by-chip linear combination for a particular bit position, corresponds to a particular symbol of a plurality of different symbols that is set high at the particular bit position, and each receiver code of the second group, utilized for the chip-by-chip linear combination for a particular bit position, corresponds to a particular symbol of the plurality of different symbols that is set low at the particular bit position.

13. The method of claim 10, wherein the binary value is an 8-bit binary value and the symbol is associated with an L6 message that is 2000 bits.

14. The method of claim 10, wherein each chip of the first combinational code and the second combinational code for each different bit position of the symbol is multiple bits or a single bit.

15. The method of claim 10, wherein a different correlator is utilized to correlate the modulated signal with each of the first combinational code and each of the second combinational code or one or more multiplexed correlator are utilized to correlate the modulated signal with each of the first combinational codes and each of the second combinational codes.

16. The method of claim 10, further comprising comparing magnitudes of the differenced correlation power level values with a threshold value to verify the presence of a signal.

17. An apparatus comprising:

a processor;

a demodulation subsystem including a plurality of correlators equal to a number of bits of a modulated symbol, the demodulation subsystem executed by the processor and configured to:

generate a combinational code for each bit position of the modulated symbol, where the combinational code generated for a particular bit position is a chip-by-chip linear combination of a plurality of codes, wherein each code of the plurality of codes is a predetermined code shifted a selected number of chips and each code of the plurality of codes is associated with a particular modulated symbol that is set high at the particular bit, correlate a received modulated signal with each combinational code generated for each bit position of the modulated symbol to produce a binary value, and determine the modulated symbol based on a binary value produced from the correlations.

18. The apparatus of claim 17, wherein the received modulated signal is received from a Global Navigation Satellite System (GNSS) satellite associated with the Quasi-Zenith Satellite System (QZSS).

19. The apparatus of claim 17, wherein the demodulation subsystem includes an additional correlator, the processor further configured to:

correlate the received modulated signal and an un-shifted predetermined code utilizing the additional correlator, and determine that the modulated symbol is zero when a power level associated with the additional correlator is above a power threshold value.

20. The apparatus of claim 17, wherein the received modulated signal is modulated by code shift keying (CSK).

* * * * *